US010122615B2

(12) United States Patent
Mahadevan et al.

(10) Patent No.: US 10,122,615 B2
(45) Date of Patent: Nov. 6, 2018

(54) DELAYED UPDATING OF FORWARDING DATABASES FOR MULTICAST TRANSMISSIONS OVER TELECOMMUNICATIONS NETWORKS

(71) Applicant: DELL PRODUCTS L.P., Round Rock, TX (US)

(72) Inventors: Ramasubramani Mahadevan, Tamil Nadu (IN); Pathangi N. Janardhanan, Tamil Nadu (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 15/376,966

(22) Filed: Dec. 13, 2016

(65) Prior Publication Data

US 2017/0093690 A1    Mar. 30, 2017

Related U.S. Application Data

(63) Continuation of application No. 14/151,610, filed on Jan. 9, 2014, now Pat. No. 9,553,734.

(51) Int. Cl.
| | |
|---|---|
| *H04L 12/761* | (2013.01) |
| *H04L 12/18* | (2006.01) |
| *H04L 12/741* | (2013.01) |

(52) U.S. Cl.
CPC ............ *H04L 45/16* (2013.01); *H04L 12/185* (2013.01); *H04L 45/74* (2013.01); *H04L 12/1886* (2013.01)

(58) Field of Classification Search
None
See application file for complete search history.

(56) References Cited

U.S. PATENT DOCUMENTS

| | | | |
|---|---|---|---|
| 8,576,844 B1* | 11/2013 | Ghosh | H04L 12/462 370/390 |
| 2006/0203818 A1* | 9/2006 | Chen | H04L 45/16 370/390 |

(Continued)

OTHER PUBLICATIONS

Request for Comment 4601 (Internet Engineering Task Force, Aug. 2006).

(Continued)

*Primary Examiner* — Chirag Shah
*Assistant Examiner* — Srinivasa Reddivalam
(74) *Attorney, Agent, or Firm* — Haynes and Boone, LLP.

(57) ABSTRACT

A switch (110R.3) uses a forwarding database (140F) to forward multicast packets. The switch participates in a multicast protocol (e.g. PIM) with other switches, and also uses a snooping database (e.g. for IGMP snooping) to learn about local group members, i.e. members for which the router serves as a local multicast router (e.g. the local members do not participate in the multicast protocol). When the switch learns of a local member of a multicast group, the switch updates the snooping database but may or may not install the snooping information in the forwarding database. Thus, the forwarding database is not necessarily provisioned for locally sourced data packets addressed to the group until receipt of a locally sourced data packet addressed to the group. If no such packets are received, the forwarding database is not provisioned for such packets, and therefore its size is reduced. Other features are also provided.

19 Claims, 6 Drawing Sheets

(56) References Cited

U.S. PATENT DOCUMENTS

| | | | |
|---|---|---|---|
| 2011/0149960 A1 | 6/2011 | Fernandez Gutierrez | |
| 2014/0119369 A1 | 5/2014 | Saltsidis et al. | |
| 2015/0124811 A1* | 5/2015 | Olsson .................. | H04L 12/185 370/390 |
| 2016/0014018 A1 | 1/2016 | Grosser et al. | |

OTHER PUBLICATIONS

Internet—Wikipedia, "IP multicast," https://en.wikipedia.org/w/index.php?title=IP_multicast&printable=yes, internet web page last modified Aug. 21, 2013, retrieved Oct. 28, 2013, 7 pages.

Internet—Wikipedia, "Internet Group Management Protocol," httg://en.wikigedia.org/wiki/Internet Groug Management Protocol, internet web page last modified Sep. 9, 2013, retrieved Oct. 2, 2013, 5 pages.

Internet—The Linus Document Project, "Multicast Explained," httg://www.tldg.org/HOWTO/Multicast-HOWJQ.:2.html, retrieved Jan. 9, 2014, 5 pages.

Christensen et al., "Considerations for Internet Group Management Protocol (IGMP) and Multicast Listener Discover (MLD) Snooping Switches," MEMO—The Internet Society, Network Working Group Request for Comments: 4541, May 2006, 16 pages.

Fenner, W., "Internet Group Management Protocol, Version 2," MEMO—The Internet Society, Network Working Group Request for Comments: 2236, Nov. 1997, 23 pages.

Cain et al., "Internet Group Management Protocol, Version 3," MEMO—The Internet Society, Network Working Group Request for Comments: 3376, Oct. 2002, 53 pages.

Holbrook et al., "Using Internet Group Management Protocol Version 3 (IGMPv3) and Multicast Listener Discovery Protocol Version 2 (MLDv2) for Source-Specific Multicast," MEMO—The Internet Society, Network Working Group Request for Comments: 4604, Aug. 2006, 11 pages.

Das, Sujal, "Smart-Table Technology—Enabling Very Large Server, Storage Nodes, and Virtual Machines to Scale Using Flexible Network Infrastructure Topologies," BROADCOM Corporation White Paper, StrataXGS_SmartSwitch-WP101-R, Jul. 2012, 11 pages.

BROADCOM Corporation, "Six-Port Managed 10/100 ROBOswitch™," Product Brief BCM5325E, 2004, 2 pages.

Cisco Systems, Inc., "Multicast Does Not Work in the Same VLAN in Catalyst Switches," Document ID: 68131, Updated Nov. 16, 2006, 7 pages.

Cisco Learning Home,"IP multicast—Ethernet Multicast MAC Address Mapping," https://learningnetwork.cisco.com/thread/39620?/decorator=Qrint&dis . . . , retrieved Oct. 28, 2013, 2 pages.

Cisco Systems, Inc., "Multicast Forwarding Information Base Overview," Last Updated Nov. 20, 2009, 14 pages.

Cisco Systems, Inc., "Configuring MLD Snooping for 1Pv6 Multicast Traffic," Cisco IOS Software Configuration Guide, Release 12.2SX, Chapter 36, 16 pages, http://www.cisco.com/en/US/docs/switches/lan/catalist6500/ios/12.2SX/configuration/guide/book.html.

Cisco Systems, Inc., "Configuring Unknown Unicast and Multicast Flood Control," Cisco IOS Software Configuration Guide, Release 12.2SX, Chapter 58, 4 pages, http://www.cisco.com/ en/US/docs/switches/lan/catalyst6500/ios/12.2SX/configuration/guide/book.html.

Dell Products L.P.,"Dell PowerEdge FTOS Command Line Reference Guide for the M 1/0 Aggregator", Reference Guide, Oct. 2012, 258 pages.

* cited by examiner

DELAYED UPDATING OF FORWARDING DATABASES FOR MULTICAST TRANSMISSIONS OVER TELECOMMUNICATIONS NETWORKS

CROSS REFERENCE TO RELATED APPLICATIONS

The present application is a continuation of U.S. patent application Ser. No. 14/151,610, filed on Jan. 9, 2014, incorporated herein by reference.

BACKGROUND OF THE INVENTION

The present invention relates to telecommunications networks, and more particularly to multicast transmissions.

FIG. 1 illustrates a telecommunications network having network nodes 110 interconnected by links 130. Nodes 110 include switches or routers 110R.1, 110R.2, . . . and end stations 110E.1, 110E.2, . . . . Each link 130 may be a wired or wireless link or may be a network (e.g. LAN, i.e. Local Area Network). A switch may forward packets 210 (FIG. 2) based on the packets' L2 (layer 2) destination address DA2 and/or L3 (layer 3) destination address DA3. As shown, the packet also has a layer-2 source address SA2 and may have a layer-3 source address SA3. As used herein, the terms "switch" and "router" are synonymous and refer to any computer that forwards packets transmitted over a network, but the term "router" is preferred for layer 3 forwarding.

A multicast protocol may allow a packet's destination address (DA2 and/or DA3) to specify a group of nodes 110. (Actually, an address usually identifies a node's network interface; when we say that an address identifies a node, we mean that the address identifies one or more of the node's interfaces.) A multicast transmission to a group of nodes conserves network resources compared to separate, unicast transmissions to each node. For example, if nodes 110E.1, 110E.2, 110E.11 form a group, and node 110E.10 sends a packet to the group, then only one copy of the packet is delivered to router 110R.1 and then to router 110R.2. Router 110R.2 sends one copy of the packet to router 110R.5 for delivery to node 110E.11, and sends another copy to router 110R.4 for delivery to the remaining group members. Network resources are conserved compared to sending a separate copy of the packet from source node 110E.10 to each of the three group members.

Well-known multicast protocols for IP (Internet Protocol) networks include PIM (Protocol Independent Multicast) and IGMP (Internet Group Management Protocol). IGMP version 3 is described for example in RFC 4604 (Internet Engineering Task Force (IETF), August 2006). IGMP version 2 is described in RFC 2236 (IETF, November 1997). Sparse-Mode PIM is defined by RFC 4601 (IETF August 2006). RFCs 4604, 2236, and 4601 are incorporated herein by reference. IGMP defines how a node 110 can join or leave a multicast group. PIM defines how IP routers 110R set up multicast paths for distribution of multicast packets.

IP addresses are layer-3 addresses, and a multicast group in PIM and IGMP is defined by an IP address; in IPv4 (version 4), the multicast address is any IP address in the range of 224.0.0.0 to 239.255.255.255 inclusive. For example, suppose that node 110E.1 wishes to join a group with address 225.1.1.1. Then node 110E.1 sends an IGMP packet of type Report (report group membership) to the node's local multicast router, e.g. 110R.3. Router 110R.3 uses its database (DB) 140 to make packet-forwarding decisions, and router 110R.3 updates this database in response to the IGMP packet. More particularly, DB 140 (FIG. 3) includes a membership list 140L of all group members for which the router serves as a local multicast router (such a router is called "Designated Router" in PIM). The membership list 140L is updated when the router receives an IGMP message of type Report or Leave (leave the group), or when the router does not receive a repeated Report message from a group member within predefined time (the group members periodically re-send Reports in order to retain the group membership). In the example of FIG. 3, the list 140L includes group members 110E.1, 110E.2 for group 225.1.1.1.

DB 140 also includes a Multicast Routing Information Base (MRIB) 140P constructed based on the PIM protocol and used by the router to determine the outgoing interfaces for multicast packets. An exemplary MRIB entry 144 (such as 144.1, 144L.2, or 144L.3) includes:

Source address "SA" (layer 3 address, matched against the packet's source address SA3). The asterisk (*) is a wild card meaning that the entry 144 applies to any source.

Group Address "GA" (225.1.1.1 for example).

Incoming interface "iif". An interface can be a physical interface (e.g. a port number of a physical port), but an interface may also include virtual information, e.g. the virtual LAN (VLAN). In entry 144.1, the incoming interface is a VLAN with VLAN ID of 200. This corresponds to VLAN 150.1 in FIG. 1. This VLAN is defined for link 130 connecting the router's port P5 to port P1 of router 110R.4. Link 130 may be connected to additional nodes (not shown), and VLAN 150.1 is defined for the traffic between the two routers so that the routers can distinguish this traffic from the traffic to and from other nodes connected to the link. (We will sometimes refer to VLAN 150.1 as VLAN 200; in this document, a VLAN can be referred to by its reference numeral (such as 150.1) or its ID (such as 200).)

Outgoing interface "oif" for the packet, and actions to be performed in packet forwarding. (For example, the actions may specify the layer-2 addresses for packet forwarding.)

According to entry 144.1, if a multicast data packet (as opposed to control packets) is received on VLAN 200, and has the DA3 destination address of 255.1.1.1, then the packet is forwarded on VLAN 150.2 (having VLAN ID of 10) on ports P1, P2 (for delivery to group members 110E.1, 110E.2).

According to PIM, multicast packets are distributed to the group members via one or more distribution trees rooted at pre-determined routers 110. For example, a distribution tree can be rooted at a router called the Rendezvous Point (RP). Assuming for example that the router 110R.2 is the RP, a multicast data packet received by router 110R.3 on VLAN 150.2 (VLAN 10) should be forwarded to router 110R.4 for delivery to the RP. This is accomplished via entry 144L.2: if a packet is received on VLAN 10, and has the DA3 destination address of 255.1.1.1, then the packet is forwarded on VLAN 200. (We use the letter L in 144L.2 to mark entries for locally sourced multicast packets, i.e. packets sourced by nodes for which the router is a local multicast router; such nodes are called "local nodes" below; local nodes may or may not be directly attached to the router.)

Similarly, per entry 144L.3, if a multicast data packet is received on VLAN 20 (VLAN 150.3) and has the DA3 address of 255.1.1.1, then the packet is forwarded to the RP on VLAN 200. An entry of type 144L is created for each incoming interface that can receive locally sourced multicast data packets.

Also, multicast data packets received on VLANs 10 and 20 should be forwarded to the local group members 110E.1, 110E.2 directly rather than through the RP. This is because the RP does not transmit the packets on the interfaces on which the packets are received, and therefore will not return the packets to the routers from which the packets are received. Therefore, router 110R.3 uses a non-PIM mechanism to forward the locally-sourced packets to local group members. One possible mechanism is simply to flood such packets on local VLANs (such as VLANs 10 and 20). This however undesirably increases network traffic. To avoid flooding, the locally sourced multicast data packets are sometimes forwarded only to the group members, i.e. only to nodes in the list 140L for the group.

To speed up and simplify the forwarding process, the router builds a forwarding database 140F (shown in FIG. 3 as MFIB, which stands for Multicast Forwarding Information Base). This database combines all the information needed for fast forwarding decisions. For the packets arriving on VLAN 200, the database entry 148.1 provides the same information as entry 144.1. For the packets arriving on VLAN 10, the entry 148L.2 shows that the packets must be forwarded on VLAN 200 (to the RP, per entry 144L.2) and must also be forwarded on VLAN 10 (ports P1, P2) to the local group members in list 140L. In this way, the forwarding can be performed using the MFIB 140F without consulting the list 140L.

Similarly, per entry 148L.3, the packets arriving on VLAN 20 are to be forwarded on VLAN 200 to the RP and on VLAN 10 (ports P1, P2) to the local group members.

As noted above, forwarding of locally sourced packets to the local group members is based on the IGMP messages. More particularly, DB 140 includes "IGMP snooping" database 140G. Each entry 160 of IGMP snooping database 140G has the same types of fields as entries 144 and 148. Exemplary entry 160.1 shown in FIG. 3 specifies that if a packet has any source address SA3 (as indicated by wild card *), and has IP destination address 255.1.1.1, and the packet arrived on VLAN 10, then the packet should be forwarded on VLAN 10 (ports P1 and P2). Entry 160.2 specifies the same forwarding for the packets arriving on VLAN 20. The router builds IGMP snooping database 140G based on the IGMP messages. The router combines MRIB 140P and IGMP snooping database 140G to construct MFIB 140F. When a multicast data packet arrives, the router searches MFIB 140F for a matching entry (i.e. an entry having the same source address (or the wildcard) as the packet's SA3, the same incoming interface as the interface on which the packet arrived, and the same group address as the packet's DA3). If a matching entry is found, the router forwards the packet based on the entry's outgoing interface, and the router does not need to consult the list 140L. If no matching entry is found, then the router floods the packet on the same VLAN on which the packet arrived, and/or floods the packet on other VLANs, and/or consults other information (e.g. list 140L), depending on the router and the router's configuration.

A router is sometimes conceptualized as having a "forwarding plane" and a "control plane". The forwarding plane is the router portion that receives and transmits packets. The control plane is the router portion that builds and maintains various databases (such as 140) and performs other control functions (that differ from switch to switch). In particular, the control plane processes control messages such as IGMP messages: such messages are sent to the control plane by the forwarding plane. The forwarding plane forwards data packets based on databases such as MFIB 140F that are optimized for forwarding (a similar database can be provided for unicast forwarding). If additional action may be needed to process a packet, the packet is sent to the control plane.

FIG. 4 illustrates an exemplary sequence of events. At step 310, group members 110 (e.g. nodes 110E.1, 110E.2, 110E.11) inform their respective local multicast routers (such as 110R.3 and 110R.5), via IGMP, that these nodes are members of a group (e.g. group 225.1.1.1). This is accomplished by each group member sending an IGMP Report packet 314 to the node's local multicast router. IGMP Report packet 314 is an IP packet having the same general format as in FIG. 2, and in particular the packet 314 includes the destination addresses DA3, DA2 of the local multicast router's interface(s), and the packet includes the source addresses SA2, SA3 of the sending node ("the sender", i.e. the group member). These addresses are not shown in FIG. 4. The Internet Protocol requires a packet to have the Protocol Number field 210P, which must be 2 for IGMP; and Type field 210T, which indicates whether the sender 110 is reporting its membership in the group or is leaving the group. The Type 210T is "Report" in the example shown. The packet's Group Address field 210G is the group address (225.1.1.1). In IGMP version 3, the packet may also include the L3 source addresses from which the sender desires to receive multicast transmissions (these addresses would be inserted instead of the wildcard "*" in MRIB 140P, MFIB 140F, and IGMP snooping database 140G).

At step 320, the local multicast routers updates their DB 140 (databases 140L, 140P, 140G, 140F) as needed. If the IGMP Report sender 110 is the only member of the group in list 140L, then the router notifies all other multicast routers via PIM (PIM's Join message) that the router wishes to receive packets addressed to the group.

FIG. 5 illustrates a possible state of DB 140 of router 110R.3 after execution of step 320 for group members 110E.1, 110E.2. List 140L and IGMP snooping database 140G are as in FIG. 3. MRIB entry 144.1 is the same as in FIG. 3; this entry is used to forward non-locally-sourced traffic. However, it is assumed that the router has not received a locally sourced data packet addressed to the group. Therefore, entries 144L are absent for the group.

According to PIM, if router 110R.3 starts receiving locally sourced data packets addressed to a group before the router's forwarding database is provisioned to forward such packets to non-local group members, the router must encapsulate the packets into unicast packets and forward the encapsulated packets to the RP via unicast transmission. (This is called Register operation.) When the RP receives an encapsulated packet, the RP will send a PIM Join message towards router 110R.3. (This is called "Register Stop".) The Join message will travel to router 110R.4 and then 110R.3, and in response to the Join message the routers will provision their MRIBs and MFIBs to forward the group's data packets to the RP. In particular, router 110R.3 will create entries 144L.2, 144L.3 as in FIG. 3.

MFIB 140F of FIG. 5 is formed from MRIB 140P and IGMP snooping database 140G. MFIB 140F is the same as in FIG. 3 except that it is not provisioned to forward locally sourced data packets to the RP. In particular, in entries 148L.2 and 148L.3, the outgoing interface includes only local VLANs. However, in addition to forwarding the locally sourced packets on the local VLANs, the forwarding plane should be configured to send such packets to the control plane for the Register operation. In some routers, this is accomplished as follows.

First, note on terminology: If an entry such as 144, 148, or 160, has a wildcard for the source address, the entry is sometimes referred to as (*,G). If the source address is specified, the entry is called (S,G). In FIGS. 3 and 5, all the entries are (*,G). There can be multiple entries for the same group and incoming interface, with different source addresses. Routers prefer to forward packets based on (S,G) entries, i.e. the entries having the same source addresses as the packets' SA3 addresses. If there is no matching (S,G) entry for a packet but there is a matching (*,G) entry, then the packet is forwarded based on the (*,G) entry.

In some routers, the Register operation is initiated as follows. Whenever the forwarding plane forwards a packet based on an (*,G) entry, the packet is also sent to the control plane. In the example of FIG. 5, all the IGMP snooping entries 160 are (*,G), and so are the MFIB entries; there are no (S,G) entries. Therefore, when a locally sourced packet arrives, it is forwarded to local group members per an MFIB entry 148L, and in addition the packet is sent to the control plane. The control plane searches MRIB 140P, finds a matching MRIB entry for the packet, and initiates the Register operation.

However, if the IGMP snooping plane includes an (S,G) entry, then the MFIB 140F may include an (S,G) entry 148L for locally sourced traffic. In this case, the Register operation is initiated as follows. Each entry 148 includes an indicator (called a "HIT bit", not shown) indicating whether or not the entry is being used for forwarding a packet. The control plane polls (periodically checks) the HIT bits for all the entries 148L. If for any entry 148L the HIT bit indicates that the entry is used for forwarding, then the control plane checks the MRIB, and if the MRIB is not provisioned for the locally sourced traffic addressed to the group, the control plane instructs the forwarding plane to send the packet to the control plane. The control plane then initiates the Register operation on the packet.

At step 330, a network node 110 (e.g. 110E.10 or 110E.5) sends a multicast packet to the group (i.e. with DA3 address of 225.1.1.1). At step 340, the packet reaches the local multicast router, e.g. 110R.3 or 110R.5. At step 350, the local multicast router forwards the packet to the respective group members per MFIB 140F.

Improved multicast schemes are desirable.

SUMMARY

This section summarizes some features of the invention. Other features may be described in the subsequent sections. The invention is defined by the appended claims, which are incorporated into this section by reference.

The inventors have observed that it is desirable to reduce router resources used to forward locally sourced traffic. Indeed, a router may have hundreds of local nodes belonging to thousands of groups, and for each group, the method of FIG. 4 leads to creation of a locally sourced traffic entry 148L for each incoming interface (possibly each VLAN if VLANs are used to define the interfaces). However, if the incoming interface does not receive data packets addressed to the group, then the entry is never used for forwarding, and the MFIB space is wasted. Such waste increases the size and cost of the MFIB memory and limits the number of groups that the router can handle as well as the number of interfaces on which the router can receive locally sourced multicast data packets.

Therefore, in some embodiments of the present invention, at least in some situations, when a router learns of a local group member (e.g. via IGMP Report), the router does not create the corresponding entry or entries 148L for all locally-sourced traffic. In some embodiments, the entries 148L are provided only after the router 110R.3 receives a locally-sourced multicast data packet addressed to the group.

The invention is not limited to VLANs or any other type of interfaces, nor to IGMP or PIM or any other protocol, nor to other features and advantages described above, except as defined by the appended claims.

DESCRIPTION OF SOME EMBODIMENTS

The embodiments described in this section illustrate but do not limit the invention. The invention is defined by the appended claims.

Figure 2:
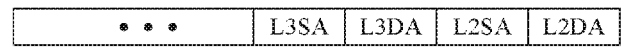
FIG. 2 illustrates a packet format used in prior art and in some embodiments of the present invention.
Figure 6:
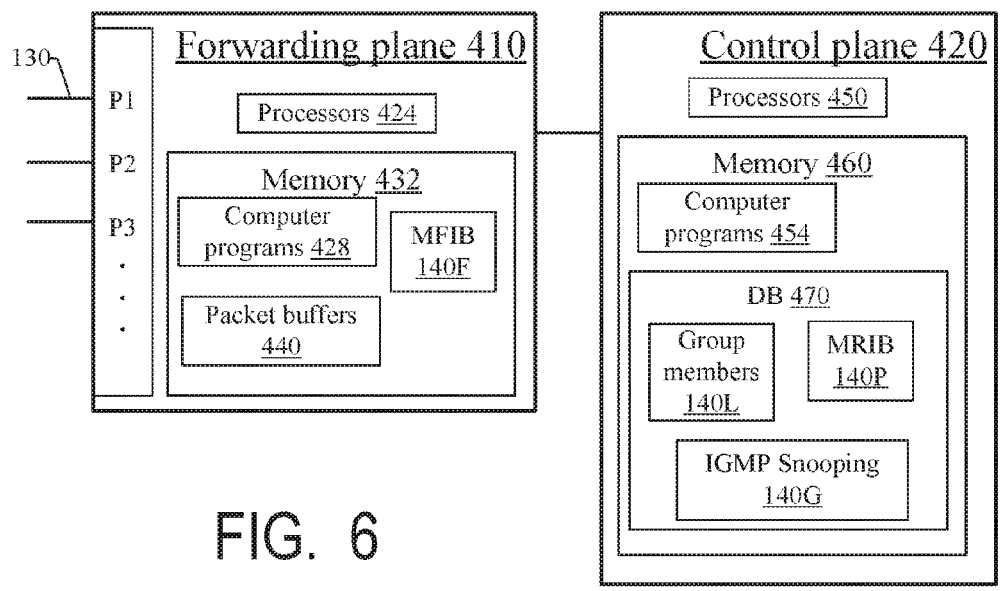
FIG. 6 is a block diagram of a router used in some embodiments of the present invention.

FIG. 6 is a block diagram of a router 110R that will be used to illustrate some aspects of the invention. (The invention is not limited to the router architecture of FIG. 6.) Router 110R has forwarding plane 410 and control plane 420. Forwarding plane 410 receives and forwards packets 210 (FIG. 2) on ports (port interfaces) P1, P2, . . . connected to links 130. The forwarding plane may include one or more computer processors 424 which execute computer programs 428 stored in memory 432. Computer programs 420 direct the processors to modify and forward packets based on forwarding databases including MFIB 140F that are stored in memory 432. The packets can be stored in memory buffers 440. In many implementations, processors 424 and other circuitry in the forwarding plane are special-purpose, fast circuits designed for speedy operation. Typically, when a task is performed by a computer processor executing computer instructions, the performance is slower than when the task is performed by dedicated hardware. Therefore, in some embodiments, the use of computer instructions in forwarding plane 410 is minimized. In contrast, control plane 420 may emphasize highly programmable, flexible functionality, possibly at the expense of lower speed, with greater use of computer instructions. The invention is not limited to these design features however.

Control plane 420 includes one or more processors 450 that execute computer programs 454 stored in memory 460. The computer programs, and possibly non-software controlled circuits, cause the control plane to run PIM, IGMP, and/or other routing and discovery protocols. For example, upon receipt of an IGMP Report or Leave packet 314, the forwarding plane 410 may pass the IGMP packet to the control plane. The control plane updates the DB 140 as needed (DB 140 may have the same databases as in FIG. 3, but the invention is not limited to any particular database architecture). Memory 460 stores group members list 140L, MRIB 140P, and IGMP snooping database 140G. Memory 460 may also store a copy of MFIB 140F (this copy is not shown in FIG. 6). Control plane 420 may command the forwarding plane to modify MFIB 140F in memory 432 as needed.

The forwarding plane and the control plane are shown as separate blocks, but they may have shared components (e.g. circuits and/or memory).

Figure 1:
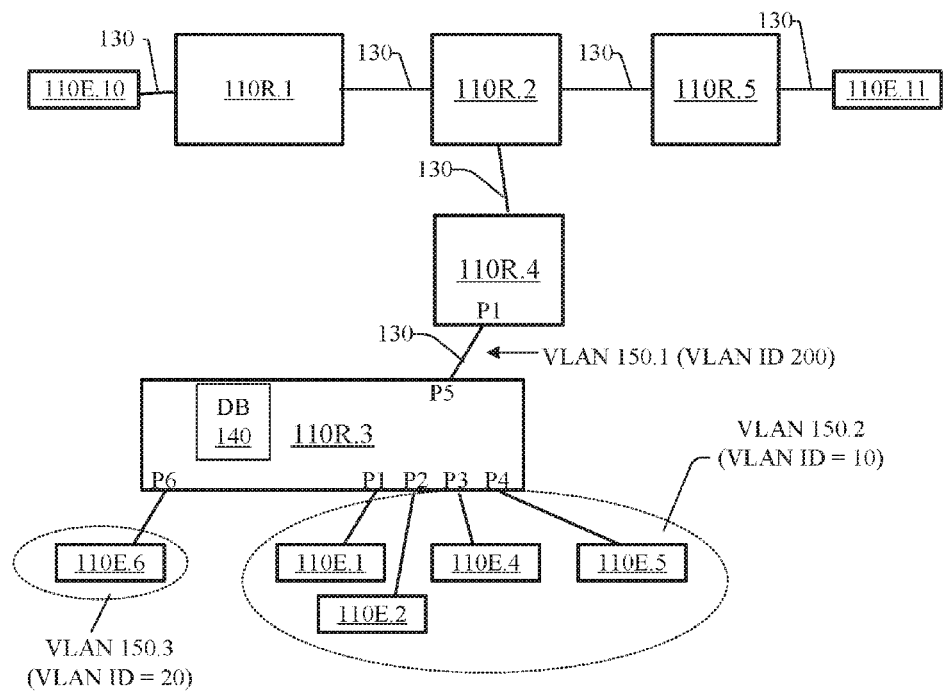
FIG. 1 is a block diagram of a network of a type used in prior art and also used in some embodiments of the present invention.
Figure 3:
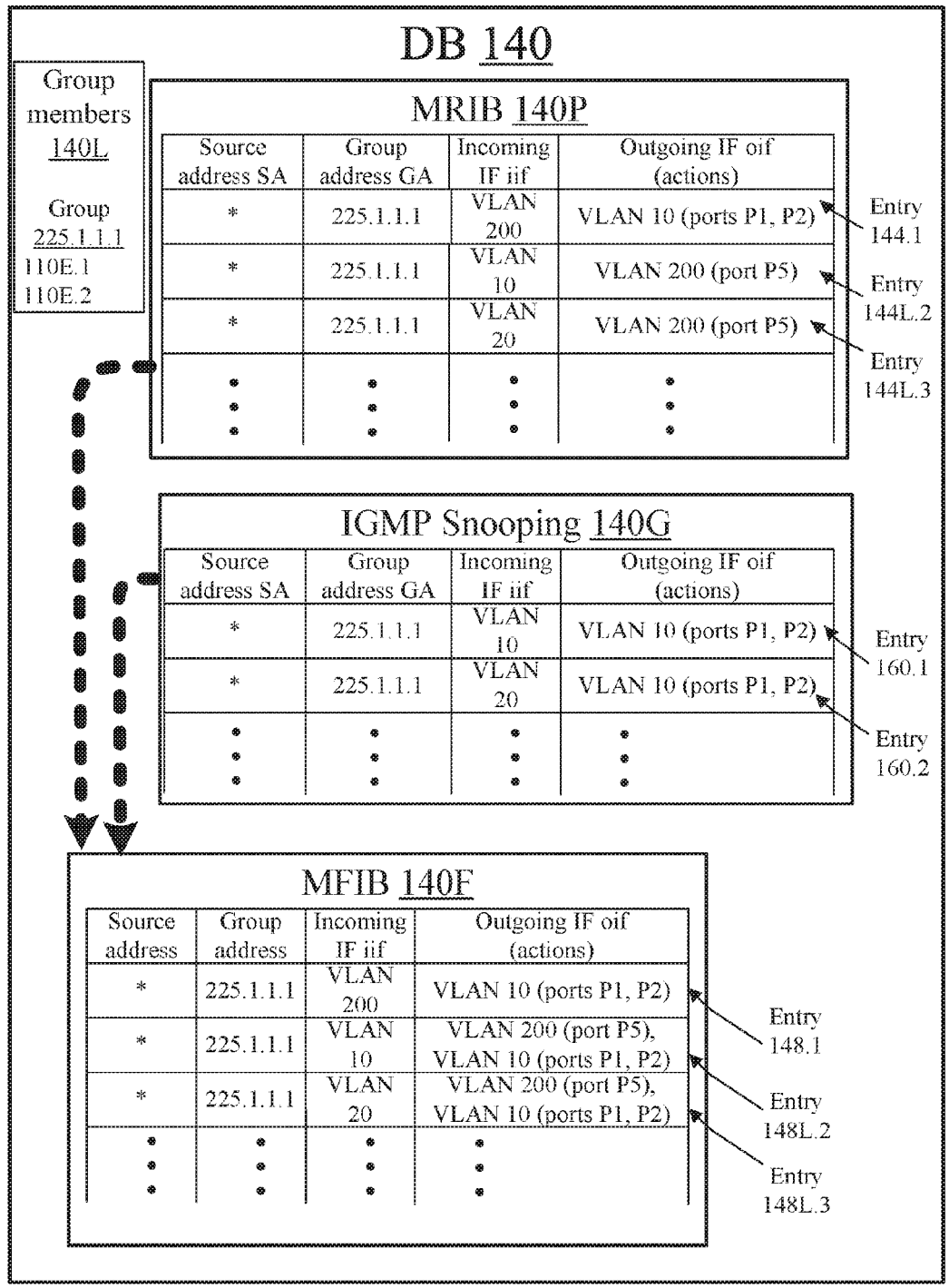
FIG. 3 is a block diagram of a router's database according to prior art.
Figure 7:
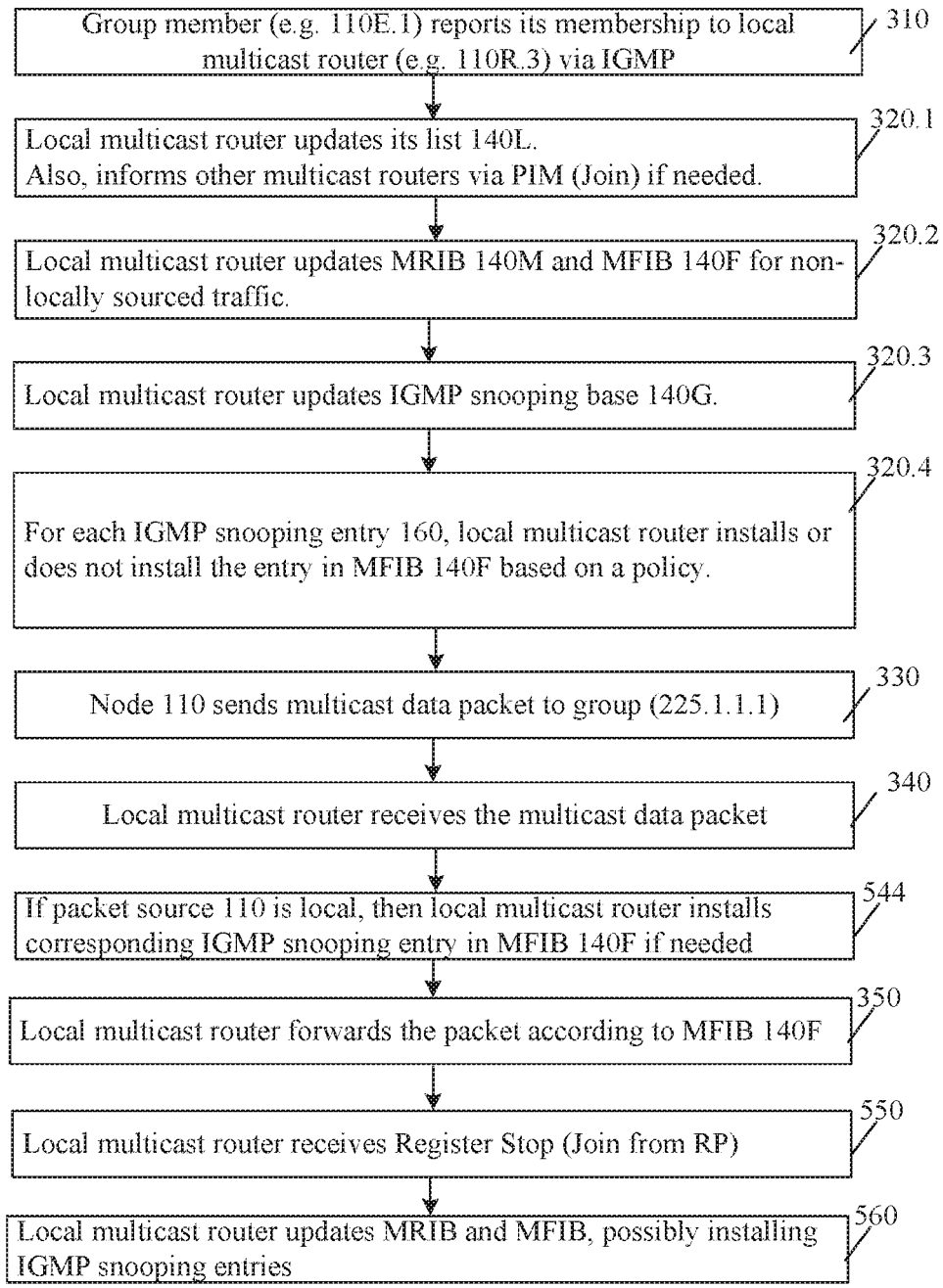
FIG. 7 illustrates operations performed to set up a forwarding database and forward multicast packets according to some embodiments of the present invention.

In some embodiments, the database 140 is as in FIG. 3, but the database updates are performed using novel methods one of which is illustrated in FIG. 7. FIG. 7 illustrates operation of router 110R according to some embodiments of the present invention. This operation will be described on the example of router 110R.3 of the network of FIG. 1.

Figure 4:
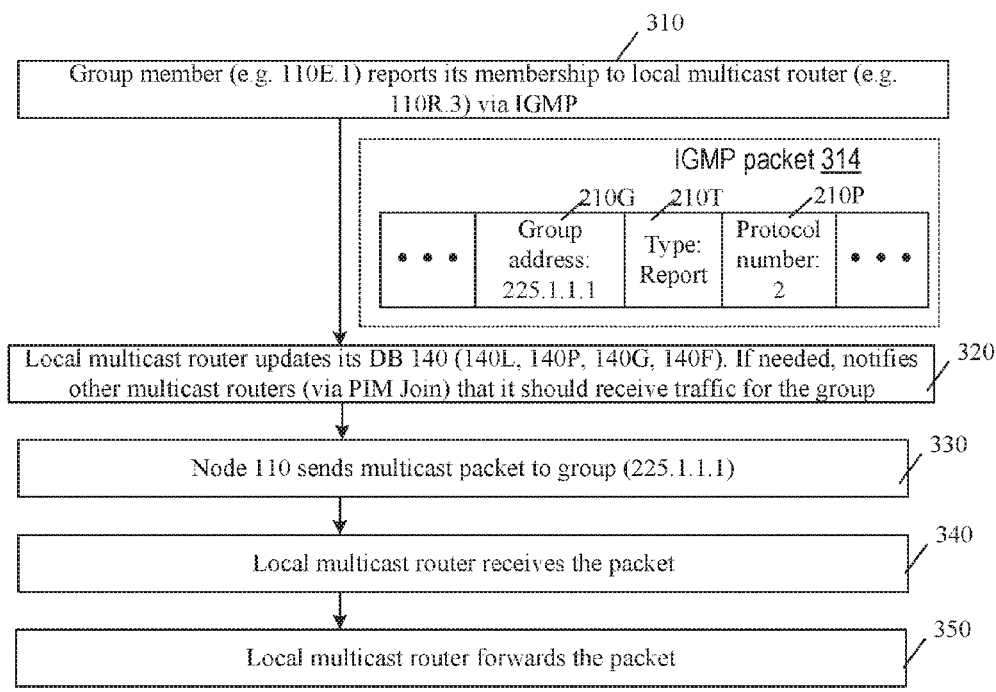
FIG. 4 illustrates operations performed to set up a forwarding database and forward multicast packets according to prior art.

At step 310, the router receives an IGMP Report message from a local group member (e.g. 110E.1). This step can be as in FIG. 4. (In some embodiments, the forwarding plane does not pass the entire IGMP Report message to the control plane but passes only pertinent information about the message, or passes a pointer to the message in buffers 440).

If the router's member list 140L does not include the sender of the IGMP report, then steps 320.1 through 320.4 are performed as follows. At step 320.1, the router (e.g. the control plane) adds the sender to group members list 140L. If the sender is the only local member of the group per list 140L, then the router notifies all other multicast routers via PIM (PIM Join message broadcast) that the router wishes to receive packets addressed to the group. These operations can be performed as at step 320 of FIG. 4.

Figure 5:
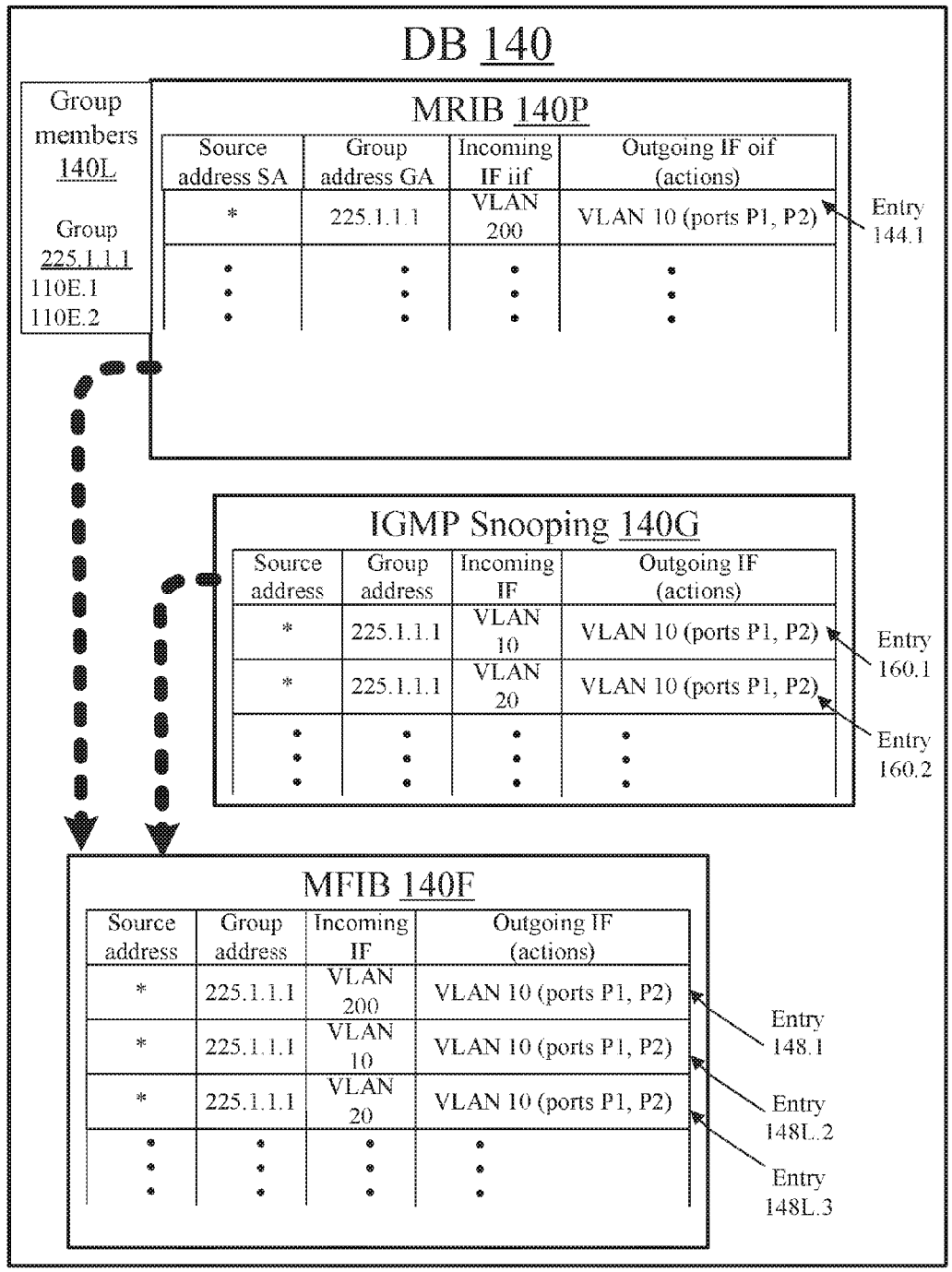
FIG. 5 is a block diagram of a router's database according to prior art.

At step 320.2, the router updates MRIB 140P for forwarding of non-locally-sourced packets to the group members in list 140L, via entries such as 144.1 in FIGS. 3 and 5. If MRIB 140P already has the entry 144.1, the entry's outgoing interface and actions may have to be updated as needed to reach the sender. The control plane updates MFIB 140F based on the updated MRIB (to create or update entries such as 148.1). These operations provision the forwarding plane to forward multicast data packets from the RP and/or other distribution trees to the group members. These operations can be performed as at step 320 of FIG. 4.

Of note, in IGMP version 3, the IGMP Report may specify the source address or addresses from which the IGMP Report sender wishes to receive multicast traffic. A separate entry 144 (and 148) or type (S,G) may be created for each source address. In some embodiments, if there are multiple source addresses, they are combined into a single entry 144 of type (*,G). Thus, only a single entry 144 can be created for multiple IGMP Reports or for a single IGMP Report that has multiple source address. Entries 148 can be similarly combined.

At step 320.3, the control plane updates the IGMP snooping database 140G with entries such as 160.1 and 160.2 in FIGS. 3 and 5. If such entries already exist, their outgoing interface and actions are updated as needed for the sender of the IGMP Report. In some embodiments, if the IGMP Report specifies source addresses, then the corresponding (S,G) entries 160 are created only for those source addresses which correspond to local nodes 110; if all the source addresses correspond to non-local nodes, then step 320.3 is omitted. Further, different (S,G) entries 160 may or may not be combined into a (*,G) entry as described above for entries 144 and 148. These operations can be performed as at step 320 of FIG. 4.

At step 320.4, the control plane may or may not install any of the snooping entries 160 in MFIB 140F. Installing a snooping entry leads to creating or updating an MFIB entry 148L for locally sourced traffic. The decision as to whether to install any of the snooping entries, can be made using any of a number of policies some of which are described below. The goal is to save room in MFIB 140F, especially if there may be no locally sourced traffic addressed to the group from at least one local incoming interface (a local incoming interface is one on which the router may receive data packets from a local node). Non-installing a snooping entry may save MFIB space but may delay forwarding for subsequent locally sourced data packets.

At step 330, a node 110 sends a multicast data packet to the group. At step 340, the router receives the packet. These steps can be as in FIG. 4.

At step 544, if the packet sender 110 is local, then the router may or may not install any of the IGMP snooping entries 160 in MFIB 140F based on any of a number of policies some of which are described below.

At step 350, the packet may be forwarded based on the updated MFIB if needed (in some embodiments, the packet may also be flooded). Alternatively, the packet may be forwarded by the forwarding plane, and also possibly flooded, before the MFIB is updated by the control plane.

At step 550, the local multicast router receives a Register Stop message (Join control message from the RP). This step is possible if the router had received a locally sourced packet and forwarded it in the Register operation.

At step 560, in response to the Join, the router updates its MRIB 140P with entries 144L for all the incoming interfaces operable to receive local multicast traffic. The router installs these entries in MFIB 140F. In some embodiments, all the snooping entries 160 with the same group address are installed in the MFIB at this time. (For example, in some embodiments, the entries 160 are not installed at step 544 but are installed at step 560).

Of note, the invention is not limited to any particular sequence of the steps shown or described. For example, steps 320.1 through 320.4 can be performed in any order or simultaneously or can overlap in time.

In some embodiments, when the forwarding plane 410 receives a multicast data packet, the forwarding plane searches MFIB 140F for a matching entry (a matching entry is an entry that matches the packet's group address, incoming interface, and source address (the wildcard matches any source address)). In some embodiments, if a matching entry or entries are found, the forwarding plane forwards the packet based on such entries; the control plane is not necessarily notified and may never receive the packet. The control plane gets the packet however if there is no matching entry in MFIB 140F. The control plane may also get a packet based on other rules, e.g. the router may use HIT bits as described above, or the forwarding plane may send to the control plane all the packets forwarded based on a (*,G) entry, or other mechanisms can be used.

In some embodiments, if no matching entry is found, and the forwarding plane sends the packet to the control plane, the forwarding plane also floods the packet on the VLAN on which the packet was received. (The flooding can be blocked on any port; in particular, the flooding is blocked on any port not configured for multicast traffic.) The invention is not limited to the embodiments that perform flooding or can block flooding on a port.

Here are more examples of policies for snooping entry installation in the MFIB.

Policy 1

Step 320.4 (when to Install Snooping Entries During IGMP Report Processing)

In some embodiments, a snooping entry 160 is installed in the MFIB only if the MFIB already has a similar entry 148L and the installation involves only updating (augmenting) the outgoing interface. More particularly, for each snooping entry 160 created or updated at 320.3, the control plane searches MFIB 140F for all the corresponding entries 148L which have the same group address (GA) and incoming interface (iif) as entry 160. If the entry 160 is (S,G), then the corresponding entries 148L are (S,G) with the same source address SA as entry 160. If the entry 160 is (*,G), then the corresponding entries 148L are all of the (*,G) and (S,G) entries, regardless of the source address. The control plane updates the outgoing interfaces of the corresponding entries 148L based on the entry 160, thus installing the entry 160 in the MFIB.

In other embodiments, an entry 148L is considered "corresponding" if it has the same group address as entry 160, regardless of the incoming interface and the source address. In other words, the entry 160 is installed if there is any entry 148L with the same group address.

If there are no corresponding entries 148L, then the control plane does not install the entry 160 in the MFIB.

Steps 544, 560 for Policy 1 (when to Install Snooping Entries During Locally Sourced Packet Forwarding or on Register Stop)

In some embodiments, when a locally-sourced data packet arrives (step 544), the control plane installs all the entries 160 having the same GA as the packet's DA3, the same SA (or the wildcard) as packet's SA3, and the same incoming interface as the interface on which the packet arrived.

In other embodiments, the control plane installs all the entries 160 having the same group address, regardless of their source address or the incoming interface.

In still other embodiments, the control plane installs all the entries 160 regardless of the group address.

In some embodiments, no installation of snooping entries is performed at step 544. All snooping entries with a given group address are installed when processing Register Stop (step 560).

Policy 2

Step 320.4 (when to Install Snooping Entries During IGMP Report Processing)

Do not install any snooping entries in the MFIB. The snooping entries are installed upon receipt of Register Stop. In other words, when the router processes the Join message from the RP, the router updates the MRIB entries 144L, and installs these entries in the MFIB. At that time, the router also installs the corresponding snooping entries 160 in the MFIB.

This policy reduces the MFIB utilization.

Steps 544, 560 can be as in Policy 1.

Other embodiments are possible for the steps 320.4, 544, 350, 560. For example, in some embodiments of step 320.4, the control plane installs snooping entries 160 as in Policy 1, and may or may not install one or more other snooping entries depending on the available MFIB size. Other embodiments are possible to balance the forwarding speed against the MFIB utilization (the forwarding is faster if the corresponding snooping entries are installed in the MFIB).

When a local node leaves the group, the database can be updated as in prior art.

The invention is not limited to the protocols mentioned above. For example, for IPv6, IGMP can be replaced by MLD (Multicast Listener Discovery) or other protocols. At step 350, if a packet is to be forwarded on a local LAN, the packet can be forwarded using LAN's multicast or unicast protocol; the invention is not limited to LANs that have a multicast protocol. Some embodiments do not use VLANs, and the incoming or outgoing interfaces are defined by ports or other means.

The invention is not limited to any particular format or contents for in the forwarding database or other database, nor to any particular forwarding engine.

Some embodiments provide a method comprising:

operating a first switch (e.g. 110R.3) which is one of a first set of network nodes which are network switches (e.g. the first set can be routers of a PIM domain or multiple PIM domains), wherein the first switch is operable to communicate with nodes of the first set and also with nodes of a second set which is a set of one or more network nodes, wherein each node of the second set is not in the first set (e.g. the second set may be local nodes);

wherein the first switch is operable to classify an incoming multicast data packet as being of a first type (e.g. from a PIM router) or a second type (e.g. locally sourced), wherein:

the first type comprises multicast data packets received from one or more nodes of the first set;

the second type comprises multicast data packets received from one or more nodes of the second set;

wherein the first switch uses a forwarding database (e.g. MFIB) to make forwarding decisions;

wherein operating the first switch comprises:

the first switch receiving an indication (e.g. IGMP Report) for an additional recipient of data packets addressed to a multicast group, the additional recipient being in the second set (the additional recipient can be any new recipient, possibly (but not necessarily) the only group member);

in response to the indication, the first switch provisioning the forwarding database to provide forwarding decisions for forwarding to the additional recipient of data packets of the first type (e.g. creating or updating the entries 148 for non-locally sourced traffic), but the first switch not provisioning the forwarding database for data packets of a third type of data packets, wherein each data packet of the third type is also of the second type (for example, the third type may be any locally sourced packets, or those locally sourced packets for which no corresponding entry 148L is found in the MFIB).

In some embodiments, the first switch provisions the forwarding database to provide forwarding decisions for forwarding the data packets of the third type after receiving a data packet of the third type (e.g. at step 544 or 560).

In some embodiments, the third type consists of data packets received from a selected node of the second set (for example, if IGMP Report specifies the source address of the selected node).

In some embodiments, the third type consists of data packets received on an interface operable to receive multicast data packets from at least one node of the second set (for example, if IGMP Report does not specify a source address).

In some embodiments:

the first type consists of data packets received on any interface operable to receive multicast data packets from at least one node of the first set;

the second type consists of data packets received on any interface operable to receive multicast data packets from at least one node of the second set.

In some embodiments:
the nodes of the first set exchange control messages with each other (e.g. PIM Hello messages which are PIM router discovery messages) according to a first protocol (e.g. PIM) for setting up distribution paths for distributing multicast data packets through the first set;
wherein the control messages of the first protocol are not addressed to any node of the second set.

In some embodiments, the second set does not use the first protocol.

The invention also provides network switches operable to perform the methods described above. The invention provides non-transitory computer-readable media comprising computer instructions for causing a network switch comprising one or more computer processors to execute the methods described above (the terms "medium" and "media" are used synonymously herein). The invention is not limited to software-programmable switches however.

Other embodiments and variations are within the scope of the invention, as defined by the appended claims.

The invention claimed is:

1. A method comprising operating a first switch which is one of a plurality of switches interconnected and configured to provide one or more multicast distribution trees to distribute multicast packets, the first switch comprising one or more first interfaces and one or more second interfaces, the first and second interfaces being operable to receive multicast data packets, each first interface being operable to receive multicast data packets in at least one said multicast distribution tree, each second interface being operable to receive multicast data packets that do not arrive in any said multicast distribution tree but are to be forwarded by the first switch to a root of at least one said multicast distribution tree, the first switch using a forwarding database to make forwarding decisions for the multicast packets;
wherein operating the first switch comprises:
receiving, on a second interface, an indication for a new member of a multicast group;
in response to the indication:
(a) performing "first provisioning", wherein the first provisioning is provisioning the forwarding database to provide forwarding decisions for forwarding to the new member of data packets addressed to the multicast group and received on the one or more first interfaces in at least one said multicast distribution tree;
(b) executing a predefined policy on performing "second provisioning", wherein the second provisioning is provisioning the forwarding database to provide forwarding decisions for forwarding, to the new member, of data packets addressed to the multicast group and received on the one or more second interfaces, to cause the data packets to reach the new member without going through any said multicast distribution tree and without going through any one of said switches other than the first switch, the predefined policy comprising one or more instances when performance of at least some of the second provisioning is contingent on a later event;
wherein the later event comprises receiving, on a second interface, a data packet addressed to the multicast group;
wherein in at least one said instance, the second provisioning is not performed until occurrence of the later event.

2. The method of claim 1 wherein the later event does not occur, and the second provisioning is not performed.

3. The method of claim 1 further comprising performing at least some of the second provisioning in response to receiving the data packet addressed to the multicast group in the later event.

4. The method of claim 1 wherein the later event further comprises receiving from a network a command to provision the first switch to provide forwarding decisions for multicast data packets sent by a source of said data packet received in said later event.

5. The method of claim 1 wherein the predefined policy specifies that at least some of the second provisioning is to be performed in response to the indication without waiting for the later event only if the forwarding database is already provisioned for forwarding of multicast data packets addressed to the multicast group.

6. The method of claim 1 wherein the predefined policy specifies that the second provisioning is to be performed in response to the indication without waiting for the later event only if the forwarding database is already provisioned for forwarding of multicast data packets received on the same second interface as the indication and addressed to the multicast group.

7. The method of claim 5 wherein the predefined policy specifies that the second provisioning is to be performed in response to the indication without waiting for the later event if the forwarding database is already provisioned for forwarding of multicast data packets addressed to the multicast group and received (a) on the same second interface as the indication, and (b) either from a source address specified by the indication or, if the indication does not specify a source address, from any source address.

8. A method comprising operating a first switch which is one of a plurality of switches interconnected and configured to provide one or more multicast distribution trees to distribute multicast packets, the first switch comprising one or more first interfaces and one or more second interfaces, the first and second interfaces being operable to receive multicast data packets, each first interface being operable to receive multicast data packets in at least one said multicast distribution tree, each second interface being operable to receive multicast data packets that do not arrive in any said multicast distribution tree but are to be forwarded by the first switch to a root of at least one said multicast distribution tree, the first switch using a forwarding database to make forwarding decisions for the multicast packets, the first switch using a first database to store information on how multicast data packets received on the one or more second interfaces are to be forwarded, the first switch being operable to update the forwarding database from the first database;
wherein operating the first switch comprises:
receiving, on one or more second interfaces, one or more first indications for one or more new members of one or more multicast groups;
in response to the one or more first indications:
(a) performing "first provisioning", wherein the first provisioning is provisioning the forwarding database to provide forwarding decisions for forwarding to the one or more members of data packets addressed to the corresponding one or more multicast groups and received on the one or more first interfaces in at least one said multicast distribution tree;
(b) storing, in the first database, one or more second indications that multicast data packets received on the one or more second interfaces and addressed to the one or more multicast groups are to be forwarded to the corresponding one or more new members to reach the one or more new members without going through any said multicast distribution tree and without going through any one of said switches other than the first switch;

(c) executing a predefined policy on performing "second provisioning", wherein the second provisioning is updating the forwarding database from the first database to reflect the one or more second indications, the predefined policy comprising one or more instances when performance of at least some of the second provisioning is contingent on one or more later events;

wherein for at least one first indication, the corresponding one or more later events comprise receiving, on a second interface, a data packet addressed to the corresponding multicast group, and in at least one said instance, the second provisioning is not performed until occurrence of the corresponding one or more later events.

9. The method of claim 8 wherein for at least one first indication, the corresponding one or more later events do not occur, and the forwarding database is not updated to reflect the one or more corresponding second indications from the first database.

10. The method of claim 8 wherein for at least one first indication, the corresponding one or more later events consist of receiving, on a second interface, a data packet addressed to the corresponding multicast group.

11. The method of claim 8 wherein for at least one first indication, the corresponding one or more later events consist of receiving, on a second interface, a data packet (i) addressed to the corresponding multicast group, and (ii) having a source address identical to a source address of the first indication if the first indication comprises a source address.

12. The method of claim 8 wherein for at least one first indication, the corresponding one or more later events consist of receiving, on a second interface, a data packet (i) addressed to the corresponding multicast group, (ii) having a source address identical to a source address of the first indication if the first indication comprises a source address, and (iii) received on the same second interface as the first indication.

13. The method of claim 8 wherein for at least one first indication, the corresponding one or more later events consist of receiving a multicast data packet on a second interface.

14. The method of claim 8 wherein for at least one first indication, the corresponding one or more later events consist of:
receiving, on a second interface, a data packet addressed to the corresponding multicast group; and then
receiving from a network a corresponding command to provision the first switch to provide forwarding decisions for multicast data packets sent by a source of said data packet of the corresponding later event.

15. The method of claim 8 wherein for at least one first indication, the predefined policy specifies that the corresponding second provisioning is to be performed in response to the first indication without being contingent on a later event only if the forwarding database is already provisioned for forwarding of multicast data packets addressed to the corresponding multicast group.

16. The method of claim 8 wherein for at least one first indication, the predefined policy specifies that the corresponding second provisioning is to be performed in response to the first indication without being contingent on a later event only if the forwarding database is already provisioned for forwarding of multicast data packets received on the same second interface as the first indication and addressed to the corresponding multicast group.

17. The method of claim 16 wherein for at least one first indication, the predefined policy specifies that the corresponding second provisioning is to be performed in response to the first indication without being contingent on a later event if:
the first indication specifies a source address from which the corresponding new member is to receive data packets addressed to the corresponding multicast group; and
the forwarding database is already provisioned for forwarding of multicast data packets received on the same second interface as the first indication and either from the same source address as specified by the first indication or, if the first indication does not specify the source address, from any source address, and addressed to the corresponding multicast group.

18. The method of claim 8 wherein the first forwarding database is stored in a data plane of the first switch, and the first database is stored in a control plane of the first switch.

19. A first switch which is a network switch configured to operate as one of a plurality of switches configured to provide one or more multicast distribution trees to distribute multicast packets, the first switch comprising one or more first interfaces and one or more second interfaces, the first and second interfaces being operable to be configured to receive multicast data packets, each first interface being operable to receive multicast data packets in at least one said multicast distribution tree, each second interface being operable to receive multicast data packets that do not arrive in any said multicast distribution tree but are to be forwarded by the first switch to a root of at least one said multicast distribution tree, wherein the first switch comprises a data plane configured to use a forwarding database to make forwarding decisions for the multicast packets, and comprises a control plane configured to use a first database to store information on how multicast data packets received on the one or more second interfaces are to be forwarded, the first switch being configured to update the forwarding database from the first database;

wherein the first switch is operable to perform operations of:
receiving, on one or more second interfaces, one or more first indications for one or more new members of one or more multicast groups;
in response to the one or more first indications:
(a) performing "first provisioning", wherein the first provisioning is provisioning the forwarding database to provide forwarding decisions for forwarding to the one or more members of data packets addressed to the corresponding one or more multicast groups and received on the one or more first interfaces in at least one said multicast distribution tree;
(b) storing, in the first database, one or more second indications that multicast data packets received on the one or more second interfaces and addressed to the one or more multicast groups are to be forwarded to the corresponding one or more new members to reach the one or more new members without going through any said multicast distribution tree and without going through any one of said switches other than the first switch;
(c) executing a predefined policy on performing "second provisioning", wherein the second provisioning is updating the forwarding database from the first database to reflect the one or more second indications, the predefined policy comprising one or more instances when performance of at least some of the second provisioning is contingent on one or more later events;

wherein for at least one first indication, the corresponding one or more later events comprise receiving, on a second interface, a data packet addressed to the corresponding multicast group, and in at least one said instance, the second provisioning is not performed until occurrence of the corresponding one or more later events.

* * * * *